(12) United States Patent
Mizoguchi (10) Patent No.: US 8,410,915 B2
(45) Date of Patent: Apr. 2, 2013

(54) PORTABLE TERMINAL DEVICE AND METHOD OF CONTROLLING THE SAME

(75) Inventor: Naoki Mizoguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 293 days.

(21) Appl. No.: 12/738,007

(22) PCT Filed: Oct. 17, 2008

(86) PCT No.: PCT/JP2008/002953
§ 371 (c)(1),
(2), (4) Date: Apr. 14, 2010

(87) PCT Pub. No.: WO2009/057257
PCT Pub. Date: May 7, 2009

(65) Prior Publication Data
US 2010/0238004 A1 Sep. 23, 2010

(30) Foreign Application Priority Data

Oct. 30, 2007 (JP) ................................ 2007-281942

(51) Int. Cl.
*G08B 21/00* (2006.01)
(52) U.S. Cl. .................... 340/407.1; 340/407.2; 340/7.6; 360/69; 360/75; 710/18; 235/384
(58) Field of Classification Search ............... 340/407.1, 340/407.2, 7.6; 360/69, 75; 710/18; 235/384
See application file for complete search history.

(56) References Cited

U.S. PATENT DOCUMENTS

| 6,226,536 | B1 * | 5/2001 | Miyashita | 455/567 |
| 2002/0171400 | A1 * | 11/2002 | Koyama et al. | 320/135 |
| 2005/0143152 | A1 * | 6/2005 | Yueh | 455/575.6 |
| 2006/0116165 | A1 * | 6/2006 | Ito | 455/557 |
| 2007/0087785 | A1 | 4/2007 | Kikuchi et al. | |
| 2007/0176742 | A1 * | 8/2007 | Hofmann et al. | 340/7.6 |
| 2008/0248831 | A1 | 10/2008 | Yamane et al. | |

FOREIGN PATENT DOCUMENTS

| EP | 1802156 A1 | 6/2007 |
| JP | 2001274874 A | 10/2001 |
| JP | 2002325115 A | 11/2002 |
| JP | 2003060748 A | 2/2003 |
| JP | 2003303360 A | 10/2003 |
| JP | 2004129120 A | 4/2004 |
| JP | 2004266729 A | 9/2004 |
| JP | 2005191790 A | 7/2005 |
| JP | 2006157642 A | 6/2006 |
| JP | 2007074102 A | 3/2007 |

OTHER PUBLICATIONS

International Search Report for PCT/JP2008/002953 mailed Nov. 11, 2008.
European search report for EP 088443247 dated on Jun. 18, 2012.
Form 1224 for EP 088443247 dated on Jul. 5, 2012.
Chinese Office Action for CN200880114199.3 dated Aug. 3, 2012.

* cited by examiner

*Primary Examiner* — Jennifer Mehmood
*Assistant Examiner* — Mark Rushing

(57) ABSTRACT

A portable telephone device (10) includes: a noncontact IC card communication unit (30) that performs a noncontact IC card communication; a vibration alert unit (22) that notifies the user by vibration that the noncontact IC card communication unit (30) is performing the noncontact IC card communication; and an IC card vibration alert control unit (44) that performs the control to regulate the vibration of the vibration alert unit (22) so that the vibration of the vibration alert unit (22) does not affect the communication state of the noncontact IC card communication unit (30).

6 Claims, 8 Drawing Sheets

PORTABLE TERMINAL DEVICE AND METHOD OF CONTROLLING THE SAME

CROSS-REFERENCE TO RELATED APPLICATIONS

This application is the National Phase of PCT/JP2008/002953, filed Oct. 17, 2008, which is based upon and claims the benefit of priority from Japanese Patent Application No. 2007-281942 filed on Oct. 30, 2007, the disclosure of which is incorporated herein in its entirety by reference.

TECHNICAL FIELD

The present invention relates to a portable terminal device and a method of controlling the portable terminal device, and more particularly, to a portable terminal device that has a noncontact IC card communication function and a method of controlling the portable terminal device.

BACKGROUND ART

Patent Documents 1, 2, and 4 disclose techniques that involve a light emitting unit (LED) or a vibrating unit (vibrator) as a means of notifying a user that a communication is being performed when a noncontact IC card embedded in a portable terminal device is being used. Meanwhile, Patent Document 3 discloses a technique of displaying various kinds of information on a portable terminal device through various vibration patterns of a vibrator.

As a method of controlling vibrations of a wireless telephone device, Patent Document 5 discloses a technique by which the wireless telephone device placed on a desk can be prevented from generating noise or moving and falling off the desk due to the vibration, by detecting the noise generated by the vibration of the vibrator and then reducing the intensity of the vibration of the vibrator. Further, a mobile terminal device disclosed in Patent Document 6 receives electromagnetic waves from an external reader/writer, and notifies a user of the contents of the electromagnetic waves in accordance with the reception.

[Patent Document 1] Japanese Patent Application Laid-Open No. 2001-274874
[Patent Document 2] Japanese Patent Application Laid-Open No. 2003-303360
[Patent Document 3] Japanese Patent Application Laid-Open No. 2006-157642
[Patent Document 4] Japanese Patent Application Laid-Open No. 2003-060748.
[Patent Document 5] Japanese Patent Application Laid-Open No. 2004-129120
[Patent Document 6] Japanese Patent Application Laid-Open No. 2007-074102

DISCLOSURE OF THE INVENTION

However, the conventional arts disclosed in the above Documents are yet to improve in the following aspect. When a portable terminal device including a noncontact IC card is placed on an external IC card reader/writer, a communication failure might be caused, as the portable terminal device moves out of the communication enabled area due to the vibration for notifying the communication state.

Therefore, an object of the present invention is to provide a highly-reliable portable terminal device that reduces communication failures in noncontact IC card communications as described above, and a method of controlling the portable terminal device.

According to the present invention, there is provided a portable terminal device including: a communication unit which performs a noncontact IC card communication; a vibration alert unit which notifies a user by vibration that the communication unit is performing the noncontact IC card communication; and a control unit which performs the control to regulate the vibration of the vibration alert unit so that the vibration of the vibration alert unit does not affect the communication state of the communication unit.

According to the present invention, there is provided a method of controlling a portable terminal device including controlling the vibration alert unit of the portable terminal device that includes the vibration alert unit notifying a user by vibration when the portable terminal device is performing a noncontact IC card communication. This method includes performing the control to regulate the vibration of the vibration alert unit so that the vibration of the vibration alert unit does not affect the communication state of the portable terminal device.

Any combination of the above described constitutional elements, and any method, device, system, recording medium, computer program, and so on, having the wording of the present invention applied thereto are also effective as aspects of the present invention.

Also, the constitutional elements of the present invention are not necessarily independent of one another. For example, two or more constitutional elements may be formed as a single member, one constitutional element may be formed with two or more members, one constitutional element may be part of another constitutional element, part of a constitutional element may overlap with part of another constitutional element, or the like.

The procedures according to the control method of the present invention are described in order. However, the order in the description does not limit actual order. Accordingly, when the control method of the present invention is implemented, the sequential order of the procedures may be changed without affecting the contents of the procedures.

The procedures according to the control method of the present invention are not necessarily carried out in different timings from one another. One procedure may be carried out while another procedure is being carried out, or the timing of the procedure may partially or entirely overlap with the timing of another procedure.

The present invention provides a highly reliable portable terminal device that reduces communication failures in non contact IC card communications, and a method of controlling the portable terminal device.

BRIEF DESCRIPTION OF DRAWINGS

The above and other objects, features, and advantages of the present invention will become more apparent from the following detailed description taken in conjunction with the accompanying drawings.

BEST MODE FOR CARRYING OUT THE INVENTION

The following is a description of exemplary embodiments of the present invention, with reference to the accompanying drawings. In the drawings, like constitutional elements are denoted by like reference numerals, and the same description will not be repeated.

Figure 1:
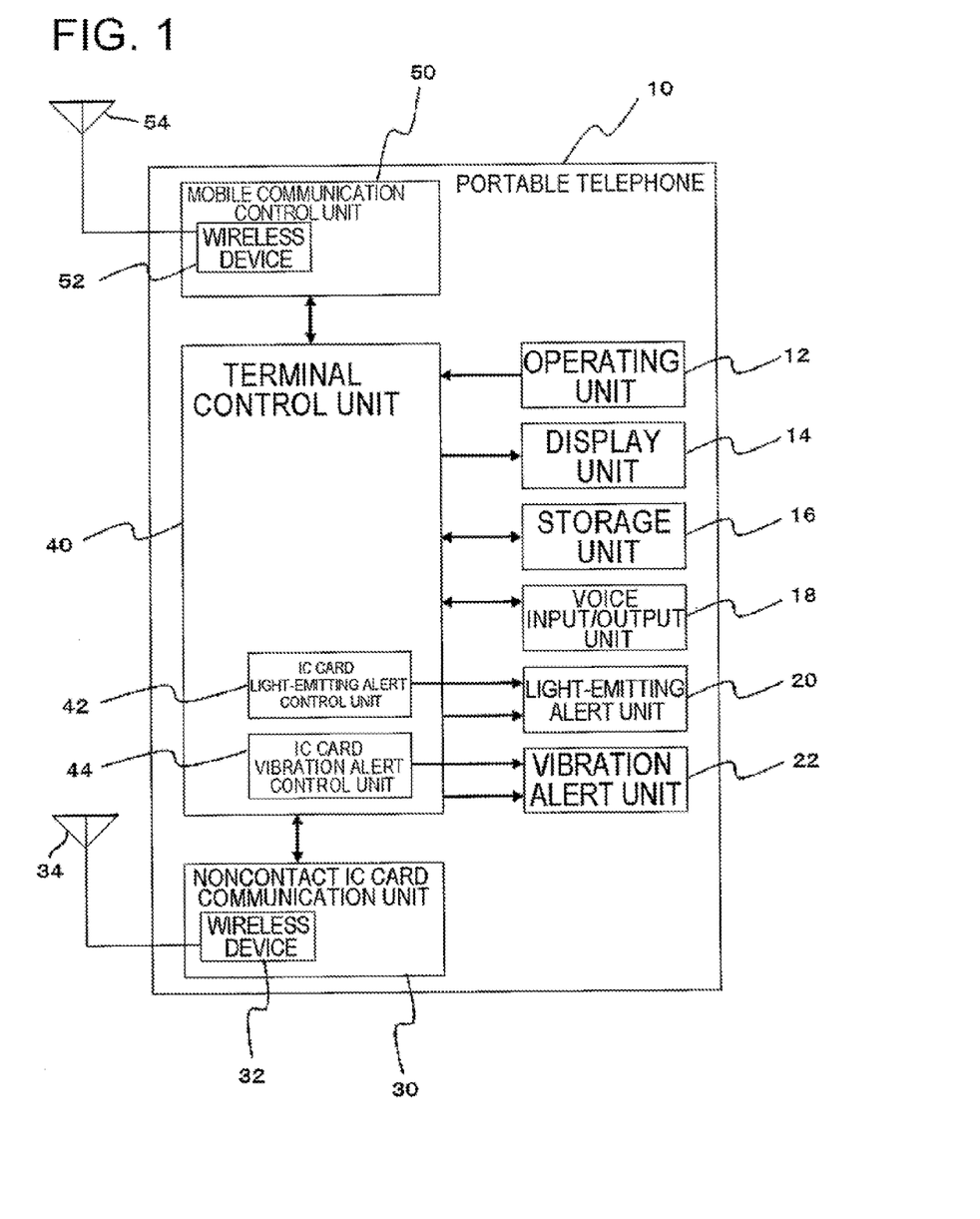
FIG. 1 is a block diagram of the structure of a portable telephone device according to an exemplary embodiment of the present invention.

FIG. 1 is a block diagram of the structure of a portable terminal device (a portable telephone 10) according to an exemplary embodiment of the present invention.

The portable terminal device (the portable telephone 10) according to the exemplary embodiment of the present invention includes: a noncontact IC card communication unit 30 that performs a noncontact IC card communication; a vibration alert unit 22 that notifies the user by vibration that the noncontact IC card communication unit 30 is performing the noncontact IC card communication; and an IC card vibration alert control unit 44 that performs the control to regulate the vibration of the vibration alert unit 22 so that the vibration of the vibration alert unit 22 does not affect the communication state of the noncontact IC card communication unit 30.

The portable terminal device of the present invention may be a portable telephone device, PHS (Personal Handyphone System), or PDA (Personal Digital Assistants), for example. In this exemplary embodiment, the portable telephone 10 is described as an example. In FIG. 1, the constitutional elements that are not relevant to the essence of the invention are not shown.

The respective constitutional elements of the portable telephone 10 are realized by any combination of the CPU of a computer, a memory, a program that is loaded into the memory, a storage unit such as a hard disk that stores the program, and hardware and software with a network connection interface. It is obvious to those skilled in the art that various modifications may be made to a method and a device for realizing the constitutional elements. The drawings described hereafter show functional blocks, instead of the structure of the hardware.

More specifically, the portable telephone 10 includes an operating unit 12, a display unit 14, a storage unit 16, a voice input/output unit 18, a light-emitting alert unit 20, the vibration alert unit 22, the noncontact IC card communication unit 30, a terminal control unit 40, and a mobile communication control unit 50.

The operating unit 12 is an input device such as an operation key, and includes a numerical keypad to dial keypad) for a user to input telephone numbers and the likes. The operating unit 12 receives an input operation from the user, and notifies the terminal control unit 40 of the input operation. The display unit 14 is a display device such as a monochrome or multicolor liquid crystal panel, and notifies the user of various kinds of states of the portable telephone 10. The storage unit 16 has a storage device that stores control information containing a control program of the portable telephone 10, and information that is input by the user or is received from outside. The voice input/output unit 18 is an audio input/output device such as a microphone or a speaker. The light-emitting alert unit 20 is a light-emitting alert device that notifies the user of a state through a blinking lamp or LED. The vibration alert unit 22 is a vibration alert device that notifies the user of a state through vibration of a vibrator or the like.

The noncontact IC card communication unit 30 includes a wireless device 32 that performs wireless communications with another terminal device (not shown) or with an IC card reader/writer (not shown) via an antenna 34. The noncontact IC card communication unit 30 is equivalent to the communication unit of an IC card (not shown) held in the portable telephone 10. The IC card performs communications at the noncontact IC card communication unit 30, to realize an IC card function. The noncontact IC card communication unit 30 also includes a memory that stores a control program and data for controlling the operation of this IC card, and a control unit which controls the entire reader/writer function and the IC card unit for performing wireless communications with external IC card readers/writers via the wireless device 32.

In this exemplary embodiment, the noncontact IC card communication unit 30 determines whether it is in the communicable enabled area with respect to an external noncontact IC card reader/writer via the wireless device 32. When determining that it is in the communication service area, the noncontact IC card communication unit 30 notifies the terminal control unit 40 to that effect. The noncontact IC card communication unit 30 then performs an IC card-based communication with the IC card reader/writer via the wireless device 32, and notifies the terminal control unit 90 of the result of the communication.

Upon receipt of a communication request for an IC card-based communication with another terminal from the terminal control unit 40 and in response to the communication request, the noncontact IC card communication unit 30 notifies the terminal control unit 40 that the noncontact IC card communication unit 30 is about to enter a communication state. The noncontact IC card communication unit 30 also performs an IC card-based communication with the other terminal device via the wireless device 32, and notifies the terminal control unit 40 of the result of the communication.

The terminal control unit 40 is connected to the respective elements of the portable telephone 10, and controls the entire device as well as those elements, to realize an operation of a portable telephone device. The terminal control unit 40 includes an IC card light-emitting alert control unit 42 and an IC card vibration alert control unit 44. Based on the information about the IC card communication states and results sorted out at the terminal control unit 40, the IC card light-emitting alert control unit 42 and the IC card vibration alert control unit 44 issue control instructions to the light-emitting alert unit 20 and the vibration alert unit 22 to alert the user.

More specifically, the terminal control unit 40 receives a service-area notification notifying that the noncontact IC card is within the communication service area of an IC card reader/writer, a communication state notification indicating that the noncontact IC card is about to enter a communication state with another terminal, or a notification of the result of an IC card-based communication, from the noncontact IC card communication unit 30. When detecting any of those notifications, the terminal control unit 40 instructs the IC card vibration alert control unit 44 and the IC card light-emitting alert control unit 42 to alert the user.

Alternatively, the terminal control unit 40 receives an instruction as a communication request made by the user through the operating unit 12, to exchange arbitrary information stored in the storage unit 16 with another terminal device with the use of the noncontact IC card communication unit 30. The terminal control unit 40 then notifies the noncontact IC card communication unit 30 of the communication request.

The IC card vibration alert control unit 44 issues a vibration control instruction to the vibration alert unit 22 to notify the user that the noncontact IC card is in the communication service area of an IC card reader/writer, the noncontact IC card is in a communication state with another terminal device, an IC card-based communication has been ended, or the like. The vibration control instruction is designed not to affect the communication state of an IC card-based communication as follows.

More specifically, the IC card vibration alert control unit 44 causes the vibration alert unit 22 to perform a vibrating operation for a predetermined period of vibration time (VTM1 or VTM2 of FIG. 7 as described below), and causes the vibration alert unit 22 to stop the vibrating operation for a predetermined period of intermission time (VITM1). In this manner, the IC card vibration alert control unit 44 causes the vibration alert unit 22 to perform an intermittent operation (steps S57 through S69 in FIG. 6 as described below).

The predetermined period of vibration time (VTM1 or VTM2) is set so as to secure a sufficient amount of time for the user to recognize vibration, and not to affect the portable telephone 10 due to the vibration. Therefore, it is preferable to set the VTM1 so that the communication error rate becomes equal to or lower than a desired threshold value, without influence on the communication state of the noncontact IC card communication unit 30.

The predetermined period of intermission time (VITM1) is a period of time in which the user can recognize the next vibrating operation after a current vibrating operation is ended. The predetermined period of vibration time may vary with intermittent operations, or may remain the same. In the intermittent operation of this exemplary embodiment, the first period of vibration time is VTM1, and the second period of vibration time is VTM2.

In this exemplary embodiment, the IC card vibration alert control unit 44 causes the vibration alert unit 22 to perform a vibrating operation at least once (steps S51 through S55 in FIG. 6 as described below). Alternatively, the IC card vibration alert control unit 44 may cause the vibration alert unit 22 to repeatedly perform vibrating operations in an intermittent operation (steps S57 through S69 in FIG. 6 as described below).

In this exemplary embodiment, when the noncontact IC card communication unit 30 is performing a noncontact IC card communication, the light-emitting alert unit 20 notifies the user to that effect by light. Here, the IC card light-emitting alert control unit 42 controls the light-emitting alert unit 20 to emit light for a longer period of emission time than the predetermined period of vibration time of the vibration alert unit 22.

In this exemplary embodiment, the terminal control unit 40 includes a monitoring timer (not shown) that performs monitoring by measuring the above-mentioned vibration time, intermission time, and light-emission time.

Those setting times are stored beforehand in a memory (not shown) of the portable telephone 10. Those setting times may be changed arbitrarily by the user when the firmware of the portable telephone 10 is upgraded or the like.

The mobile communication control unit 50 includes a wireless device 52 that is connected to a mobile communication network via an antenna 54, and performs communications. The mobile communication control unit 50 exchanges information about notifications of wireless control and wireless states with the terminal control unit 40.

Operations of the portable telephone 10 of this exemplary embodiment having the above-described structure will be described below.

Figure 2:
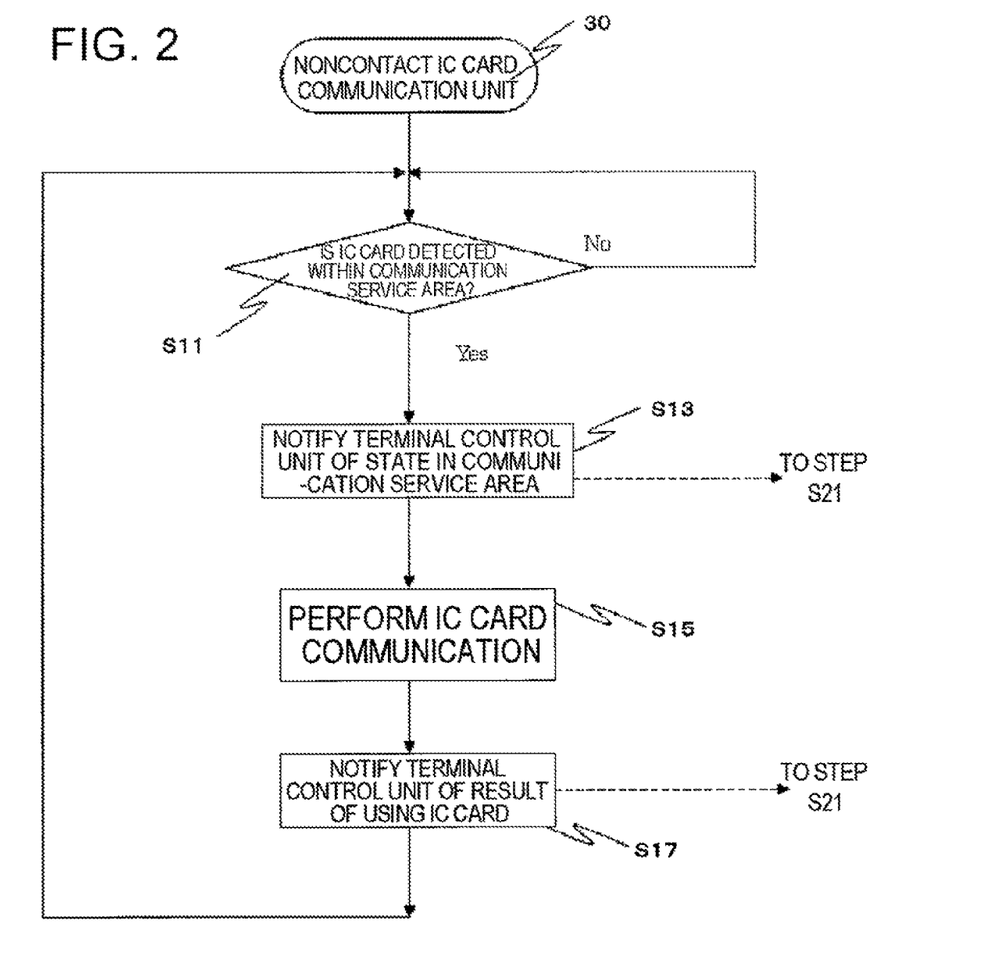
FIG. 2 is a flowchart showing an example operation of the noncontact IC card communication unit of the portable telephone device of FIG. 1.
Figure 3:
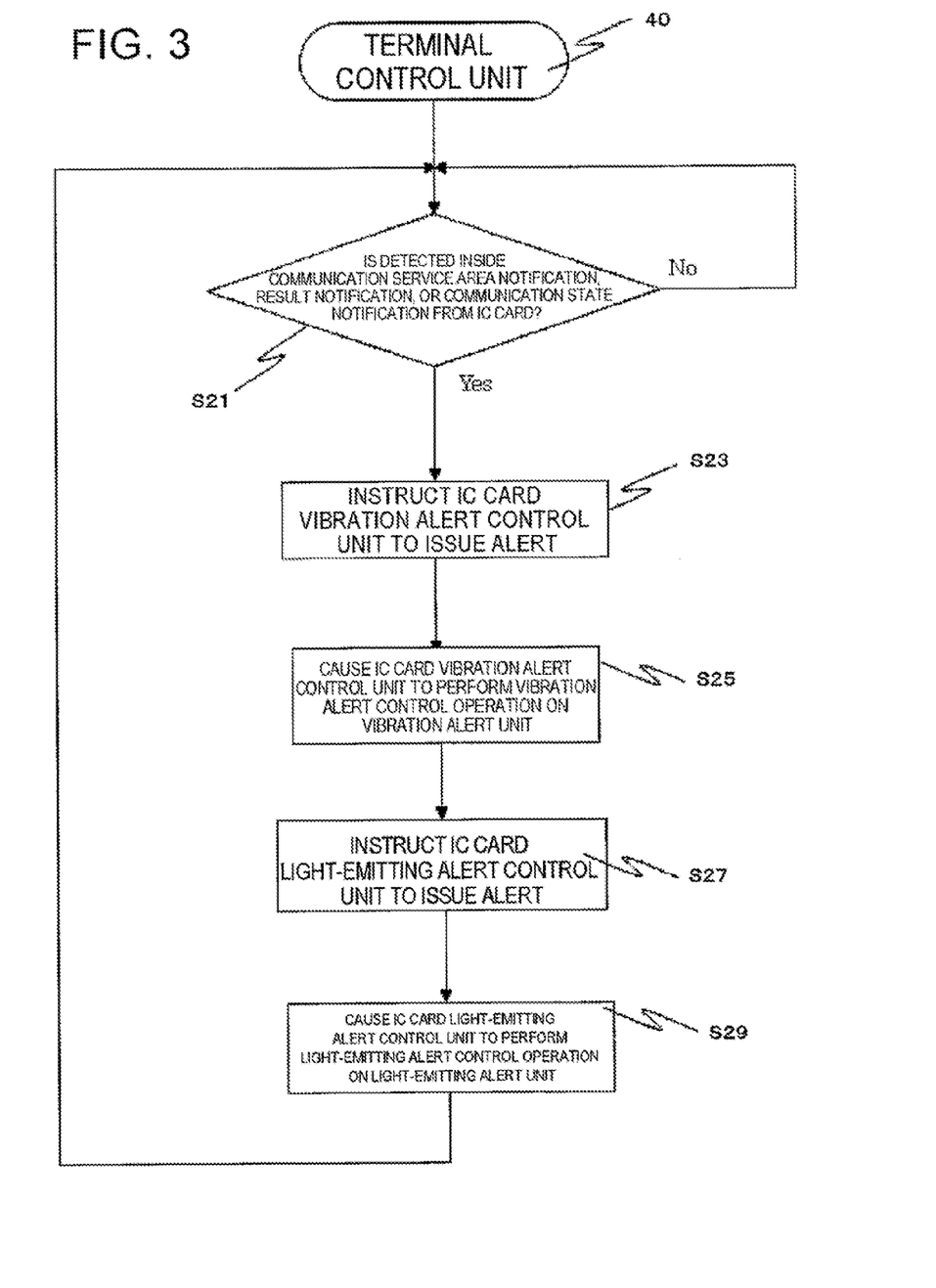
FIG. 3 is a flowchart showing an example operation of the terminal control unit when the IC card function is used in the portable telephone device of FIG. 1.

First, an operation to be performed by the portable telephone 10 using the noncontact IC card function of this exemplary embodiment is described. FIG. 2 is a flowchart showing an example operation to be performed by the noncontact IC card communication unit 30 of the portable telephone 10 of this exemplary embodiment. FIG. 3 is a flowchart showing an example operation to be performed by the terminal control unit 40 when the IC card function is used in the portable telephone 10 of this exemplary embodiment. The following is a description with reference to FIGS. 1 through 3.

When the portable telephone 10 of FIG. 1 is held over a noncontact IC card reader/writer, the noncontact IC card communication unit 30 determines whether it is within the communication service area of the noncontact IC card reader/writer via the wireless device 32 (step S11 in FIG. 2). When it is detected within the communication service area ("Yes" at step S11 in FIG. 2), the noncontact IC card communication unit 30 notifies the terminal control unit 40 that it is in the communication service area (step S13 of FIG. 2).

Referring now to FIG. 3, the terminal control unit 40 that has received the service-area notification from the noncontact IC card communication unit 30 detects that it is within the communication service area ("Yes" at step S21 of FIG. 3). To notify the user that it is within the noncontact IC card communication service area, the terminal control unit 40 instructs the IC card light-emitting alert control unit 42 and the IC card vibration alert control unit 44 to perform light-emitting alert control and vibration alert control, respectively (steps S23 and S27 of FIG. 3). Upon receipt of the instructions, the IC card light-emitting alert control unit 42 and the IC card vibration alert control unit 44 perform the light-emitting alert control and the vibration alert control on the light-emitting alert unit 20 and the vibration alert unit 22, respectively (steps S25 and S29 of FIG. 3).

Referring back to FIG. 2, the noncontact IC card communication unit 30 performs an IC card-based communication (step S15 of FIG. 2), and notifies the terminal control unit 40 of the result of the IC card-based communication (step S17 of FIG. 2).

Referring to FIG. 3, the terminal control unit 40 that has received the notification of the result from the noncontact IC card communication unit 30 determines that the notification is a result notification ("Yes" at step S21 of FIG. 3), and carries out procedures for notifying the user of the result. The procedures are the same as the procedures of steps S23 through S29 of FIG. 3 carried out by the terminal control unit 40 to detect the IC card communication service area, and therefore, description of them will not be repeated herein.

Next, an example operation of the portable telephone 10 of this exemplary embodiment will be described in the case where the noncontact IC card communication unit 30 performs a communication with another portable terminal device, without the use of the noncontact IC card function in. For example, the user performs a terminal operation at the operating unit 12, and exchanges any information about the terminal stored in the storage unit 16 with the other portable terminal device in this operation.

Figure 4:
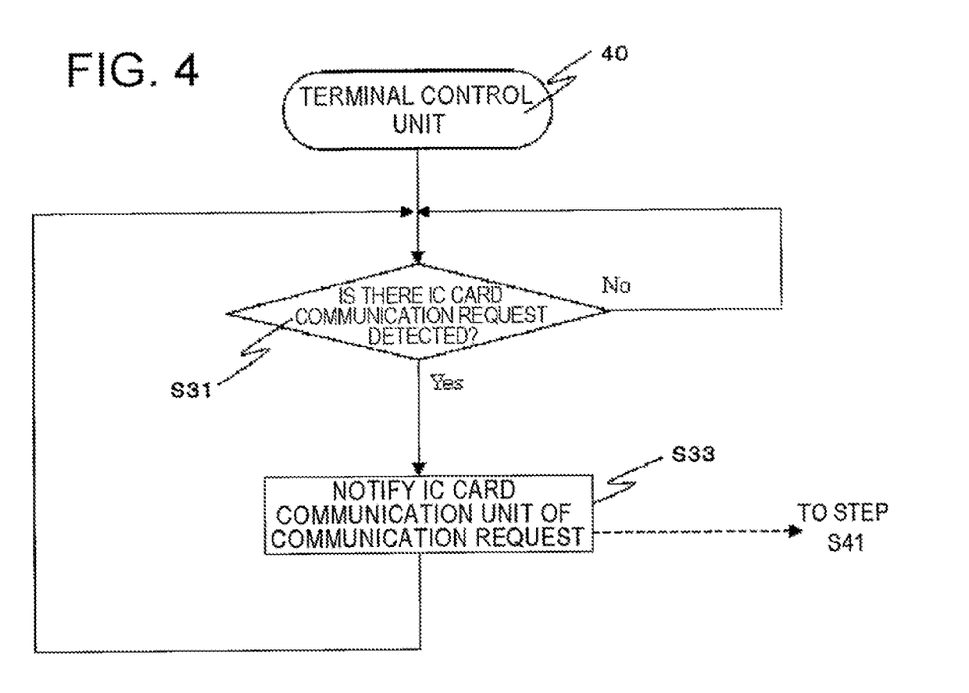
FIG. 4 is a flowchart showing an example operation of the terminal control unit when the IC card function is not used in the portable telephone device of FIG. 1.
Figure 5:
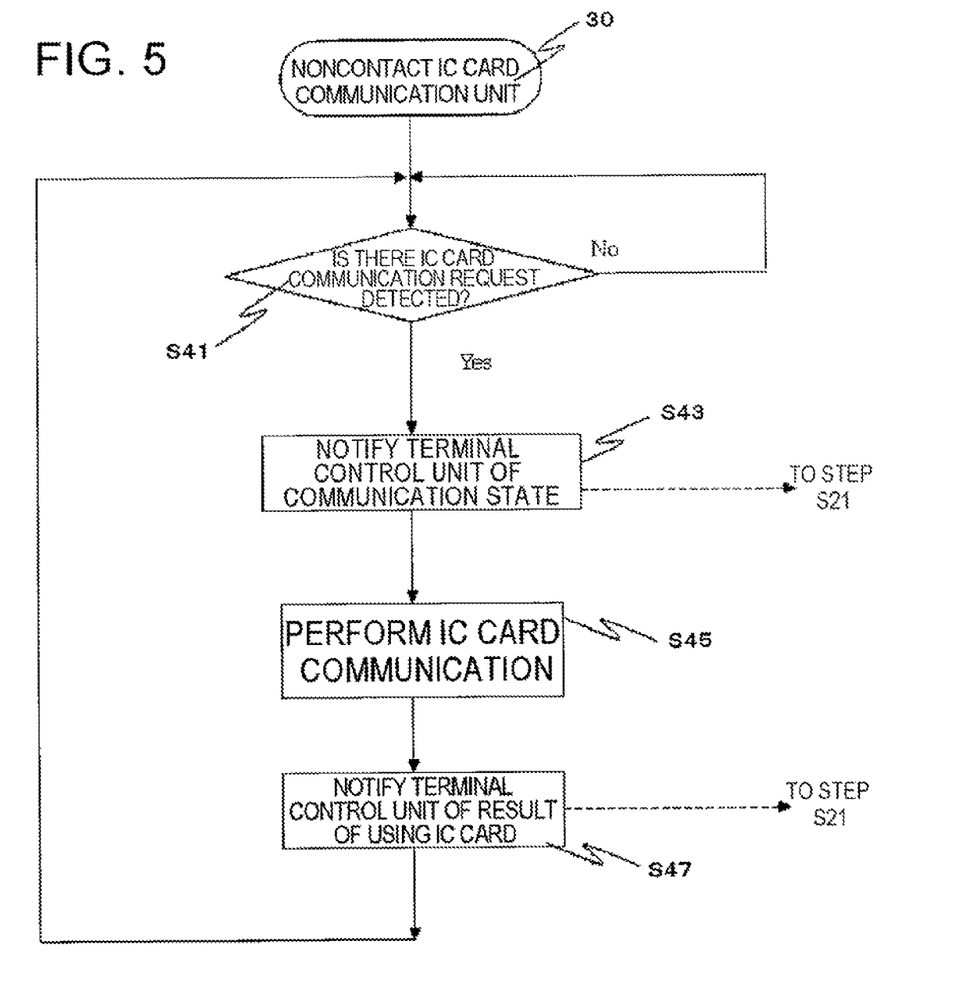
FIG. 5 is a flowchart showing an example operation of the non con tact IC card communication unit of the portable telephone device of FIG. 1.

FIG. 4 is a flowchart showing an example operation to be performed by the terminal control unit 40 not using the IC card function of the portable telephone 10 of this exemplary embodiment. FIG. 5 is a flowchart showing an example operation to be performed by the noncontact IC card communication unit 30 of the portable telephone 10 of this exemplary embodiment. The descriptions will be made hereinafter, with reference to FIG. 1 and FIGS. 3 through 5.

When the user issues an instruction through the operating unit 12 to exchange desired information stored in the storage unit 16 with the use of the noncontact IC card communication unit 30, the terminal control unit 40 is requested to perform an IC card-based communication. The terminal control unit 40 determines whether there is an IC card communication request (step S31 of FIG. 4). When an IC card communication request ("Yes" at step S31 of FIG. 4) is detected, the terminal control unit 40 sends a communication request to the noncontact IC card communication unit 30 (step S33 of FIG. 4).

Referring now to FIG. 5, when the noncontact IC card communication unit 30 detects a communication request ("Yes" at step S41 of FIG. 5), the noncontact IC card communication unit 30 notifies the terminal control unit 40 that it is about to enter a communication state, so as to start a communication (step S43 of FIG. 5).

Referring back to FIG. 3, having received a notification from the noncontact IC card communication unit 30, the terminal control unit 40 detects a communication state ("Yes" at step S21 of FIG. 3). To notify the user of the communication state, the terminal control unit 40 instructs the IC card light-emitting alert control unit 42 and the IC card vibration alert control unit 44 of this exemplary embodiment to perform alert control (steps S23 and S27 of FIG. 3). Upon receipt of the instructions, the IC card light-emitting alert control unit 42 and the IC card vibration alert control unit 44 perform light-emitting alert control and vibration alert control on the light-emitting alert unit 20 and the vibration alert unit 22, respectively (steps S25 and S29 of FIG. 3).

Referring back to FIG. 5, in the meantime, the noncontact IC card communication unit 30 performs an IC card-based communication (step S45 of FIG. 5), and notifies the terminal control unit 40 of the result of the IC card-based communication (step S47 of FIG. 5).

Referring to FIG. 3, the terminal control unit 40 that has received the result notification from the noncontact IC card communication unit 30 determines that the notification is a result notification ("Yes" at step S21 of FIG. 3), and carries out procedures for notifying the user of the result. The procedures are the same as the procedures of steps S23 through S29 of FIG. 3 carried out by the terminal control unit 40 to detect the IC card communication service area, and therefore, description of them will not be repeated herein.

Next, an operation of the portable telephone 10 of this exemplary embodiment will be described in the case where IC card vibration alert control is performed. FIG. 6 is a flowchart showing an example operation of the portable telephone 10 of this exemplary embodiment when IC card vibration alert control is performed. FIG. 7 is a diagram for explaining operations of the IC card light-emitting alert control unit 42 and the IC card vibration alert control unit 44 of the portable telephone 10 of this exemplary embodiment. The following is a description of those operations, with reference to FIGS. 1, 6 and 7.

The techniques disclosed in the above mentioned patent documents aim to cause users to recognize various states through vibration control and light-emission control. Therefore, the operation control became diverse among those techniques. In the present invention, on the other hand, the limitation on the vibration of the vibration alert unit 22 is set, as will be describe below. According to the method of controlling the vibration alert unit 22 of the portable telephone 10 of this exemplary embodiment of the present invention, in which the portable telephone 10 has the vibration alert unit 22 which notifies a user through vibrations when the portable telephone 10 is performing a noncontact IC card communication, and the method includes performing the control to regulate the vibration of the vibration alert unit 22 so that the vibration of the vibration alert unit 22 does not affect the communication state of the portable telephone 10.

Figure 6:
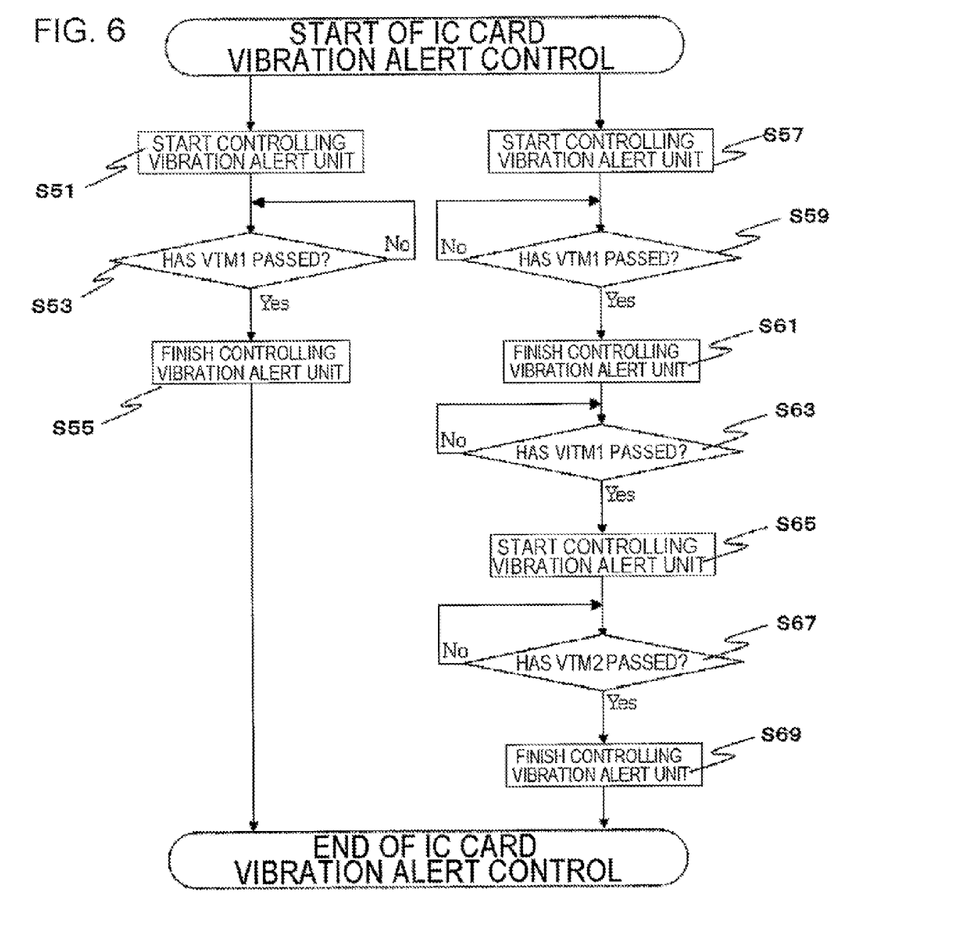
FIG. 6 is a flowchart showing an example operation when IC card vibration alert control is performed in the portable telephone device of FIG. 1.
Figure 7:
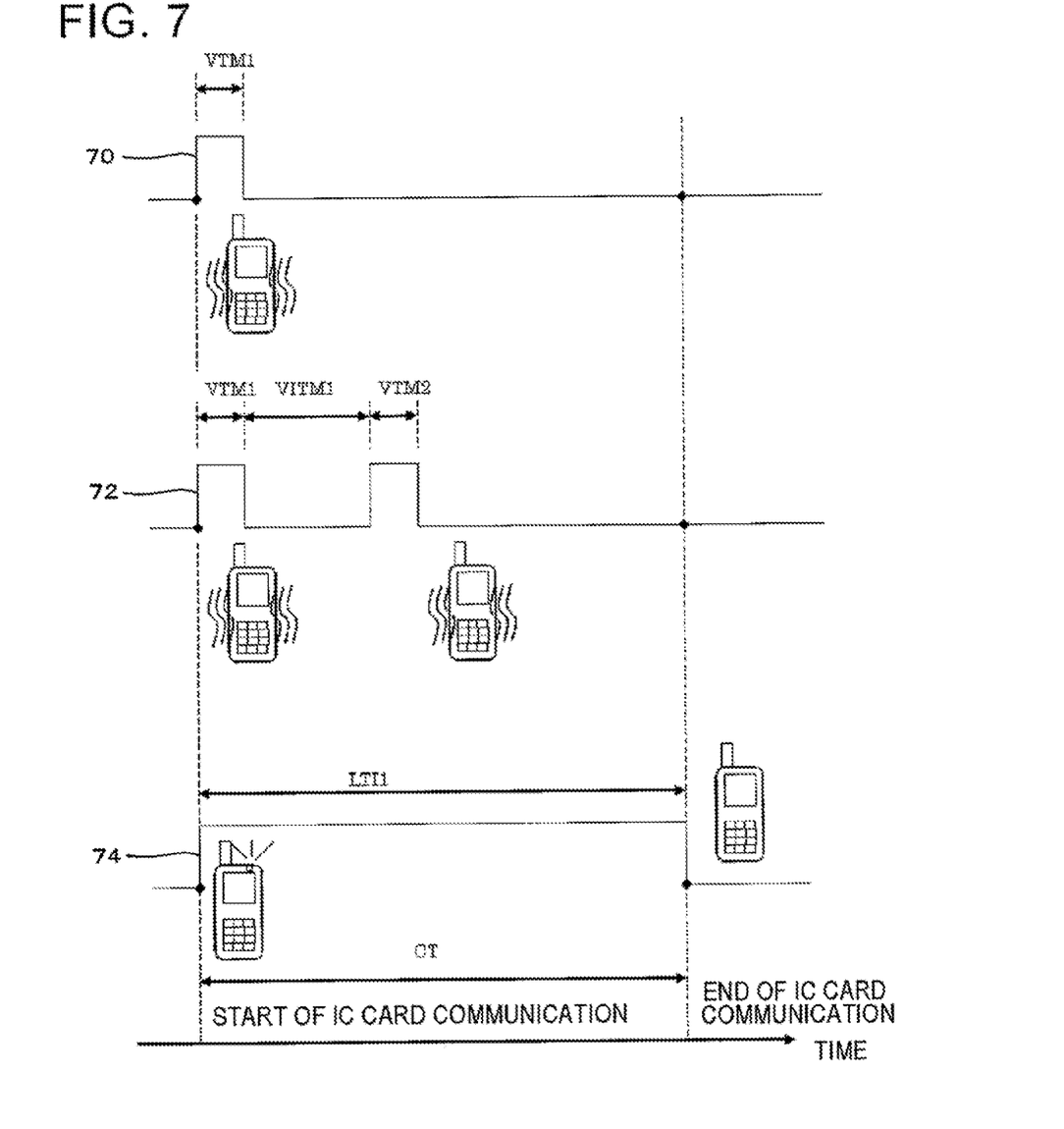
FIG. 7 is a diagram for explaining operations of the IC card vibration alert control unit and the IC card light-emitting alert control unit of the portable telephone device of FIG. 1.

More specifically, as a method of notifying a user of the operating state of the noncontact IC card communication unit 30, there is a method of notifying a user of the IC card operating state by performing vibration control for a predetermined period of time (steps S51 through S55 of FIG. 6) and performing intermittent operation control (steps S57 through S69 of FIG. 6). In the intermittent operation control, the vibration control of the predetermined period of time is repeatedly performed at predetermined intervals. In this exemplary embodiment, an example case where control is performed through the one-time vibrating operation shown in steps S51 through S55 of FIG. 6 is described as an example of the vibration control (the flowchart of FIG. 3) performed when the noncontact IC card communication unit 30 performs a wireless communication with an IC card reader/writer, and the IC card vibration alert control unit 44 notifies the terminal control unit 40 of the communication service area, the communication result, and the communication state. Also, an example case where intermittent operation control is performed by the IC card vibration alert control unit 44 through the two-time vibrating operation shown in steps S57 through S69 of FIG. 6 is described as an example of the vibration control (the flowchart of FIG. 4) performed when the noncontact IC card communication unit 30 performs a wireless communication with another terminal device and makes a request for an IC card communication with another terminal.

This exemplary embodiment has been described above as a case where the alert control by the vibration alert unit 22 is performed through a one-time vibrating operation, when an IC card-based communication with an IC card reader/writer is performed. This exemplary embodiment has been also described above as another case where the alert control by the vibration alert unit 22 is performed through an intermittent operation with a two-time vibrating operation when an IC card-based communication with another terminal device is performed. However, the present invention is not limited to that. In the case of either an IC card reader/writer or another terminal device, one of the two operations may be performed, regardless of the type of operation or the object with which the noncontact IC card communication unit 30 performs a wireless communication. Also, operations may be classified under different conditions. The different conditions may include the existence or nonexistence of a communication error. For example, the same vibrating operation may be performed once, or an intermittent operation involving repetitive vibrating operations may be performed. An intermittent operation involving repetitive vibrating operations may be performed at the time of a communication with an IC card reader/writer, and a one-time vibrating operation may be performed at the time of a communication with another terminal device.

At step S51 of FIG. 6, the IC card vibration alert control unit 44 instructs the vibration alert unit 22 to start a vibrating operation, and the vibration alert unit 22 starts vibrating. The IC card vibration alert control unit 44 monitors the elapse of the predetermined time VTM1 (step S53 of FIG. 6). After the elapse of time VTM1 ("Yes" at step S53 of FIG. 6), the IC card vibration alert control unit 44 instructs the vibration alert unit 22 to stop the vibrating operation, and the vibration alert unit 22 stops vibrating (step S55 of FIG. 6).

In the procedures of steps S51 through S55 of FIG. 6, the vibrating operation for an IC card vibration alert is performed only once only during the time VTM1, as indicated by the line 70 in FIG. 7.

At step S57 of FIG. 6, the IC card vibration alert control unit 44 instructs the vibration alert unit 22 to start a vibrating operation, and the vibration alert unit 22 starts vibrating. The IC card vibration alert control unit 44 monitors the elapse of the predetermined time VTM1 (step S59 of FIG. 6). After the elapse of time VTM1 ("Yes" at step S59 of FIG. 6), the IC card vibration alert control unit 44 instructs the vibration alert unit 22 to stop the vibrating operation, and the vibration alert unit 22 stops vibrating (step S61 of FIG. 6).

The IC card vibration alert control unit 44 further monitors the elapse of the predetermined time VITM1 (step S63 of FIG. 6). After the elapse of VITM1 ("Yes" at step S63 of FIG. 6), the IC card vibration alert control unit 44 instructs the vibration alert unit 22 to start a vibrating operation, and the vibration alert unit 22 starts vibrating (step S65 of FIG. 6). The IC card vibration alert control unit 44 monitors the elapse of the predetermined time VTM2 (step S67 of FIG. 6). After the elapse of time VTM2 ("Yes" at step S67 of FIG. 6), the IC card vibration alert control unit 44 instructs the vibration alert unit 22 to stop the vibrating operation, and the vibration alert unit 22 stops vibrating (step S69 of FIG. 6).

As described above, in the procedures of steps S57 through S69 of FIG. 6, the vibrating operation for an IC card vibration alert is performed twice, as indicated by the line 72 in FIG. 7. Here, the vibrating operation by the vibration alert unit 22 is performed only at the start of an IC card-based communication, and is not repeated throughout the IC card-based communication (CT). At the end of the IC card-based communication, a controlled vibrating operation may be performed to notify the user of the communication result at the time of a communication error or the like.

Figure 8A:
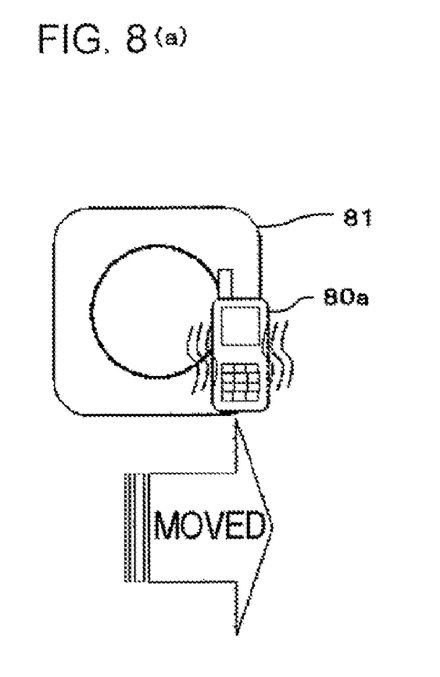
FIG. 8 is a diagram for explaining operations of the portable telephone device on an IC card reader/writer.
Figure 8B:
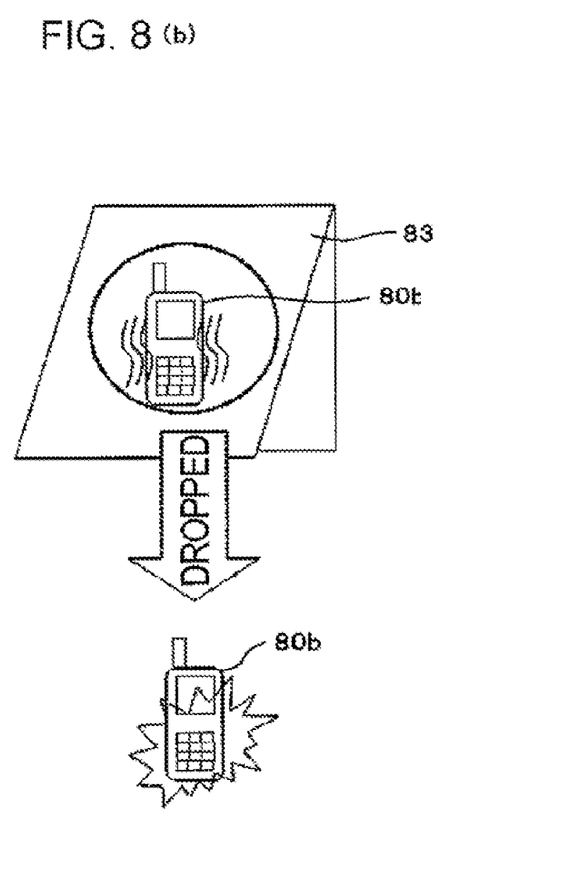

As described above, by the vibration control method according to this exemplary embodiment, it is possible to stabilize the portable telephone 10 on an IC card reader/writer, and maintain an excellent wireless communication state between the IC card reader/writer and the noncontact IC card communication unit 30 of the portable telephone 10. This is because the influence of vibration on the portable telephone 10 can be restrained by the IC card vibration alert control unit 44 controlling the vibration alert unit 22 to alert the user through a vibrating operation for a predetermined period of time when an TC card communication is performed. For example, as shown in FIG. 8(*a*), a portable telephone device 80*a* can be prevented from moving away from the communicable enabled area of an IC card reader/writer 81 placed on a flat surface. Also, as shown in FIG. 8(*b*), the probability that a portable telephone device 80*b* falls off an IC card reader/writer 83 placed on a tilted surface can be eliminated or lowered.

The IC card light-emitting alert control unit 42 that controls light-emitting alerts performs light-emission control in synchronization with the vibration control performed by the IC card vibration alert control unit 44, as indicated by the line 74 in FIG. 7. Since the light emitting operation of the light-emitting alert unit 20 does not cause the portable telephone 10 to vibrate or the like, it is not necessary to perform a suppressing operation as in the vibration control in the present invention. For example, the light emitting operation can be performed within a predetermined period of time (LTI1), as indicated by the line 74 in FIG. 7. Alternatively, it is possible to notify the user of the operating state through light-emission control that varies in accordance with the IC card operating state. Since the vibration alert unit 22 limits the vibration time, the light-emitting alert unit 20 preferably operates for a longer period of time than the vibration alert unit 22, and has a larger effect to cause the user to recognize the operating state.

During an IC card-based communication, the light-emitting alert unit 20 may have an LED staying on or blinking in a certain blinking pattern, for example. Also, the light-emitting alert unit 20 may perform a light emitting operation in a pattern that varies with the results of IC card-based communications. Also, a user can arbitrarily validate or invalidate, through the operating unit 12, the alerting operation by the light-emitting alert unit 20 or the vibration alert unit 22.

As described above, in the portable telephone 10 of this exemplary embodiment of the present invention, control is performed to suppress vibrations at the time of a noncontact IC card communication. Accordingly, even if a communication is performed while a portable telephone device is left on an IC card reader/writer, the portable telephone device can be prevented from moving out of the communication enabled area or falling off the IC card reader/writer. In this manner, communication failures in noncontact IC card communications can be reduced, and false operations of the portable terminal device can be prevented. Thus, the reliability of the portable terminal device can be increased.

Since the vibration time can be shortened to such a degree that a user can still recognize vibration, the power consumption by vibrating operations can be reduced. Further, it is possible to notify a user of the operating state through light emission in synchronization with vibration alerts, and the light-emission time is set longer than the vibration time in the present invention. In this manner, a user can be prevented from failing to recognize each communication state.

Although exemplary embodiments of the present invention have been described so far with reference to the accompanying drawings, those exemplary embodiments are merely examples of the present invention, and other various structures may be employed.

For example, in the above described exemplary embodiments, the method of controlling the vibration alert unit 22 providing vibration is a method of limiting the vibration time to a predetermined period of time. However, it is also possible to perform alert vibration control at the time of use of an IC card by restricting the driving force to a smaller force than the driving force generated by vibration often used in portable telephone devices receiving incoming calls. By restricting vibration with the smaller driving force, the number of intermittent operations can be increased in combination with the restriction on the vibration time, and a wider state notification effect can be achieved.

Also in another exemplary embodiment, a unit for detecting an IC card-based communication with an IC card reader/writer may be provided, and the IC card vibration alert control unit 44 may perform vibration dampening control or intermittent operation control only when a communication with an IC card reader/writer is performed. In this manner, the portable telephone 10 can be stabilized on an IC card reader/writer, and it becomes possible to maintain an excellent wireless communication state between the IC card reader/writer and the noncontact IC card communication unit 30 of the portable telephone 10.

Although the invention of the present application is described with reference to the exemplary embodiments as above, the invention of the present application is not limited to the above-described exemplary embodiments. Various modifications, which may be understood by one skilled in the art, may be made in the configuration and detail of the invention of the present application within the scope of the invention of the present application.

The invention claimed is:

1. A portable terminal device, comprising:
   a communication unit which performs a noncontact IC card communication;
   a vibration alert unit which notifies a user by vibration that said communication unit is performing said noncontact IC card communication; and
   a control unit which performs the control to suppress said vibration of said vibration alert unit so that said vibration of said vibration alert unit does not affect a communication state of said communication unit, wherein
   said control unit causes said vibration alert unit to perform a vibrating operation for a predetermined period of vibration time and stop the vibrating operation for a predetermined period of intermission time, thereby performing an intermittent operation, and
   said control unit instructs said vibration alert unit so that said predetermined period of vibration time of said intermittent operation is shorten to equal to or more than the time in which said user can recognize said vibration, and equal to or less than the time in which the portable terminal device itself does not move due to said vibration.

2. The portable terminal device as set forth in claim 1, wherein said predetermined period of intermission time is a time in which said user can recognize a next vibrating operation after said vibrating operation is ended.

3. The portable terminal device as set forth in claim 1, wherein said vibration alert unit performs said vibrating operation at least once.

4. The portable terminal device as set forth in claim 1, further comprising:
   a light-emitting alert unit which notifies said user through light that said communication unit is performing the noncontact IC card communication; and
   a light-emission control unit which controls said light-emitting alert unit to emit light for a predetermined period of emission time that is longer than said predetermined period of vibration time of said vibration alert unit.

5. The portable terminal device as set forth in claim 1, wherein said communication unit performs the noncontact IC card communication with an IC card reader/writer.

6. A method of controlling a portable terminal device that includes a vibration alert unit which notifies a user by vibration when said portable terminal device is performing a noncontact IC card communication, the method being for controlling said vibration alert unit, the method comprising:
   performing the control to suppress said vibration of said vibration alert unit so that said vibration of said vibration alert unit does not affect a communication state of said portable terminal device,
   causing said vibration of said vibration alert unit to perform a vibrating operation for a predetermined period of vibration time and stop the vibrating operation for a predetermined period of intermission time, thereby performing an intermittent operation, and
   instructing said vibration of said vibration alert unit so that said predetermined period of vibration time of said intermittent operation is shorten to equal to or more than the time in which said user can recognize said vibration, and equal to or less than the time in which the portable terminal device itself does not move due to said vibration.

* * * * *